Patented June 10, 1941

2,245,517

UNITED STATES PATENT OFFICE 2,245,517

POLYAZO DYESTUFFS

Paul Zervas, Cologne-Mulheim, Germany, assignor to General Aniline & Film Corporation, New York, N. Y., a corporation of Delaware No Drawing. Application December 8, 1939, Serial No. 308,149. In Germany August 27, 1937

4 Claims. (Cl. 260—166)

The present invention relates to new polyazo-dyestuffs and to a method of preparing the same; more particularly it relates to water-soluble, substantive polyazodyestuffs containing two azo groups in peri-position, corresponding to the general formula:

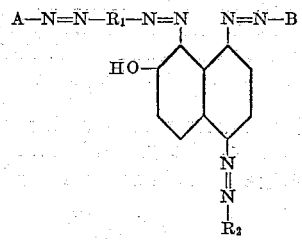

In this formula A and B stand for radicals of final components, namely, m-diaminobenzene, hydroxybenzene or m-dihydroxybenzene or the substitution products or derivatives thereof, $R_1$ stands for an arylene radical and $R_2$—N=N— for the radical of a diazo component; at least one sulfonic group is contained in the dyestuff molecule.

The final components A and B of the above formula the m-diaminobenzenes, hydroxybenzenes and m-dihydroxybenzenes may be substituted in the nucleus by alkyl, halogen, the —NO$_2$, the —SO$_3$H and the —COOH group; the m-diaminobenzenes may further be substituted in the amino groups by hydroxyalkyl, carboxyalkyl or sulfoalkyl radicals. For the radical $R_1$ chiefly radicals of benzene, diphenyl or naphthalene, for $R_2$ chiefly those of benzene or naphthalene come into question, bearing substituents usual with such dyestuff components. The new dyestuffs are obtained by combining in acid solution 1-amino-7-hydroxynaphthalene with a diazo compound, coupling the dyestuff thus obtained in an alkaline solution with a saponifiable diazo compound, e. g. with formyl-1.3-diaminobenzene, or with a tetrazo compound, saponifying in the first case, tetrazotizing or diazotizing, as the case may be, and combining with a final component. Another possibility is to combine the monoazodyestuff, obtained by the first coupling in acid medium, with a diazoazo compound, prepared by coupling a tetrazo compound with one mol of a final component, then to diazotize the aminotrisazodyestuff thus obtained and to couple with a further mol of a final component. In building up these dyestuffs the components are selected in such a way that at least one sulfonic group is contained in the dyestuff molecule.

The new water-soluble polyazodyestuffs dye vegetable fibers directly and can, according to the final component, be developed with p-nitrodiazobenzene, β-naphthol etc. or aftertreated with copper or chromium salts. All these dyeings are distinguished—while otherwise showing the same good properties—over similar dyestuffs which bear only one or no azo-bridge in peri-position, by a remarkably improved fastness to light.

The following examples illustrate the invention, without, however, limiting it thereto, the parts being by weight.

Example 1

15.9 parts of 1-amino-7-hydroxynaphthalene are dissolved in 14 parts of hydrochloric acid (sp. gr. 1.19) and 250 parts of water and at 10–15° C. combined with a diazo solution prepared from 17.3 parts of p-aminobenzene sulfonic acid. The coupling which begins at once, is made complete by adding a solution of 10 parts of sodium acetate. After 5 hours the mixture is heated for a short time to 40° C. and the dyestuff formed is isolated. The dyestuff paste is dissolved in 2000 parts of water and combined in the presence of 28 parts of sodium carbonate with a diazo solution of 13.6 parts of formyl-1.3-diaminobenzene at 3–5° C. When the coupling is complete the mixture is saponified by adding 180 parts of sodium hydroxide solution (sp. gr. 1.36) and heating to 40° C. for 2 hours, made acid to Congo red paper by adding 250 parts of hydrochloric acid (sp. gr. 1.19), and the dyestuff is isolated. The dyestuff paste is suspended in 3000 parts of water, rendered just alkaline with sodium hydroxide solution and indirectly diazotized by adding 500 parts of ice, 15 parts of sodium nitrite and 150 parts of hydrochloric acid (sp. gr. 1.19) for two hours at 3–5° C. After destroying the excess of nitrous acid a solution of 10.8 parts of 1.3-diaminobenzene and 18.8 parts of 1.3-diaminobenzene-4-sulfonic acid are added to the diazotization mixture. By adding drop by drop a solution containing 60 parts of sodium carbonate the coupling is finished. The isolated dyestuff represents a dark powder, which dyes cotton yellowish brown shades and yields a full brown of good fastness to light when treated with p-nitrodiazobenzene. The dyestuff corresponds in the free state to the following formula:

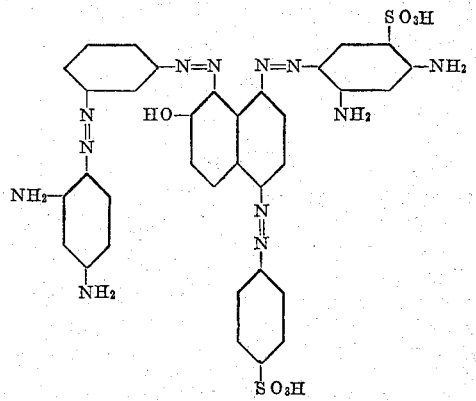

If in this example the p-aminobenzene sulfonic acid is replaced by m- or o-aminobenzene sulfonic acid dyestuffs of similar properties are obtained.

Example 2

The azodyestuff obtained according to Example 1 from 23.0 parts of diazotized acetyl-1.4-diaminobenzene-2-sulfonic acid and 15.9 parts of 1-amino-7-hydroxynaphthalene is combined in an alkaline sodium carbonate solution with a diazo solution from 15.0 parts of formyl-2.4-diamino-1-methylbenzene, saponified, indirectly tetrazotized and coupled with a solution of 10.8 parts of 1.3-diaminobenzene and 18.8 parts of 1.3-diaminobenzene-4-sulfonic acid. The isolated dyestuff dyes cotton yellowish-brown shades and yields a brown fast to light when aftertreated with p-nitrodiazobenzene. The dyestuff corresponds in the free state to the following formula:

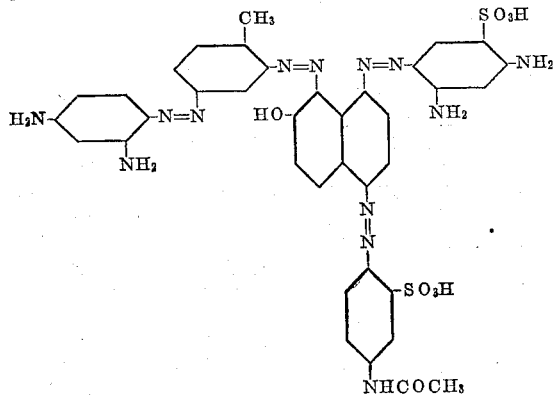

Example 3

The azodyestuff obtained according to Example 1 from the diazo compound of 22.3 parts of 1-aminonaphthalene-4-sulfonic acid and 15.9 parts of 1-amino-7-hydroxynaphthalene is combined in an alkaline sodium carbonate solution with a diazo solution from 13.6 parts of formyl-2.4-diaminobenzene, saponified, indirectly tetrazotized and coupled with a solution of 30.4 parts of N-hydroxyethyl-1.3-diaminobenzene. The isolated dyestuff dyes cotton yellowish-brown shades and yields a reddish-brown when aftertreated with p-nitrodiazobenzene. The dyestuff corresponds in the free state to the following formula:

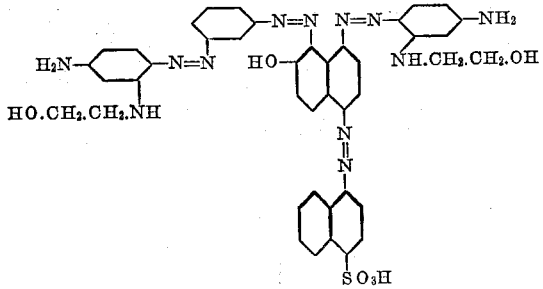

Example 4

According to Example 1 the diazo compound obtained from 21.6 parts of formyl-1.3-diaminobenzene-4-sulfonic acid is combined in acetic medium with 15.9 parts of 1-amino-7-hydroxynaphthalene. The isolated dyestuff is combined in an alkaline sodium carbonate solution with the coupling product obtained from the tetrazo compound of 18.4 parts of 4.4'-diaminodiphenyl (0.1 mol) and 13.8 parts of 1-hydroxybenzene-2-carboxylic acid (0.1 mol), indirectly diazotized and coupled with 11.0 parts of 1.3-dihydroxy-benzene. When the coupling is complete the dyestuff is heated with sodium hydroxide solution to 45° C. for two hours to split off the formyl group. The isolated dyestuff dyes cotton brown shades and yields a bluish-brown when aftertreated with p-nitrodiazo-benzene. The dyestuff corresponds in the free state to the following formula:

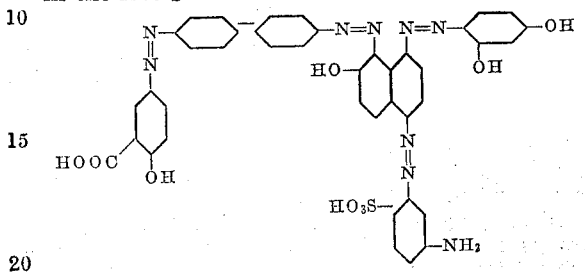

This application is a "continuation-in-part" of my copending application Ser. No. 226,247, filed August 23, 1938, now issued as U. S. Patent No. 2,190,750 dated Feb. 20, 1940.

I claim:

1. As new products water-soluble substantive polyazodyestuffs of the general formula:

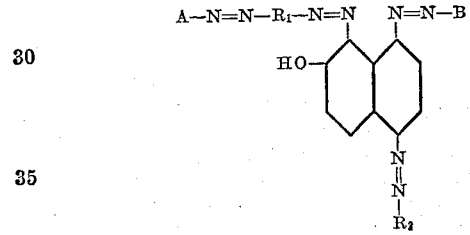

wherein A and B stand for radicals of final components selected from the group consisting of m-diaminobenzene, hydroxybenzene, m-dihydroxybenzene, the alkyl, halogen, $NO_2$, $SO_3H$, COOH nuclear substitution products thereof and the N-hydroxyalkyl-, N-carboxy-alkyl, N-sulfo-alkyl-derivatives of the said diamines, $R_1$ stands for one of the group consisting of monocyclic and bicyclic aromatic radicals and $R_2$ stands for a radical selected from the group consisting the benzene and the naphthalene series, at least one sulfonic group being present in the dyestuff molecule.

2. As new products water-soluble substantive polyazodyestuffs of the general formula:

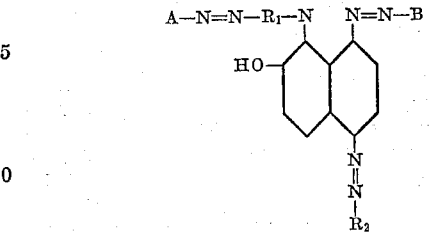

wherein A and B stand for radicals of final components selected from the group consisting of m-diaminobenzene, hydroxybenzene, m-dihydroxybenzene, the alkyl, halogen, $NO_2$, $SO_3H$, COOH nuclear substitution products thereof and the N-hydroxyalkyl-, N-carboxyalkyl, N-sulfoalkyl-derivatives of the said diamines, $R_1$ stands for a benzene radical and $R_2$ stands for a radical selected from the group consisting the benzene and the naphthalene series, at least one sulfonic group being present in the dyestuff molecule.

3. As new product the water-soluble substantive polyazodyestuff corresponding in its free state to the formula:
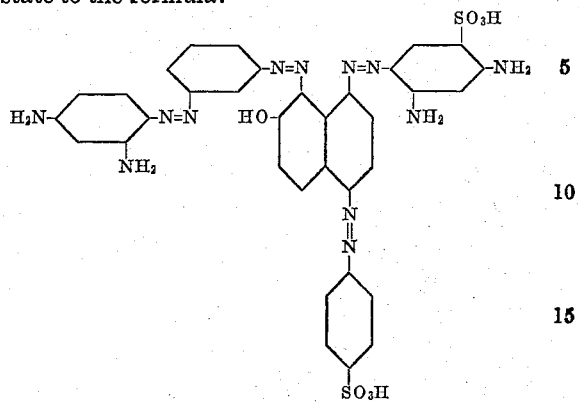
dyeing cotton directly yellowish-brown shades which change to a full brown fast to light when aftertreated with p-nitrodiazobenzene.
4. As new product the water-soluble substantive polyazodyestuff corresponding in its free state to the formula:
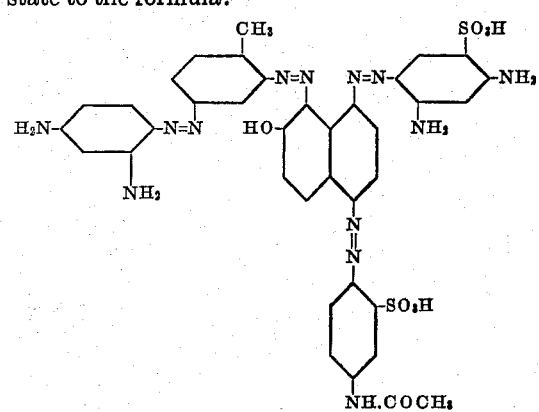
PAUL ZERVAS.